UNITED STATES PATENT OFFICE.

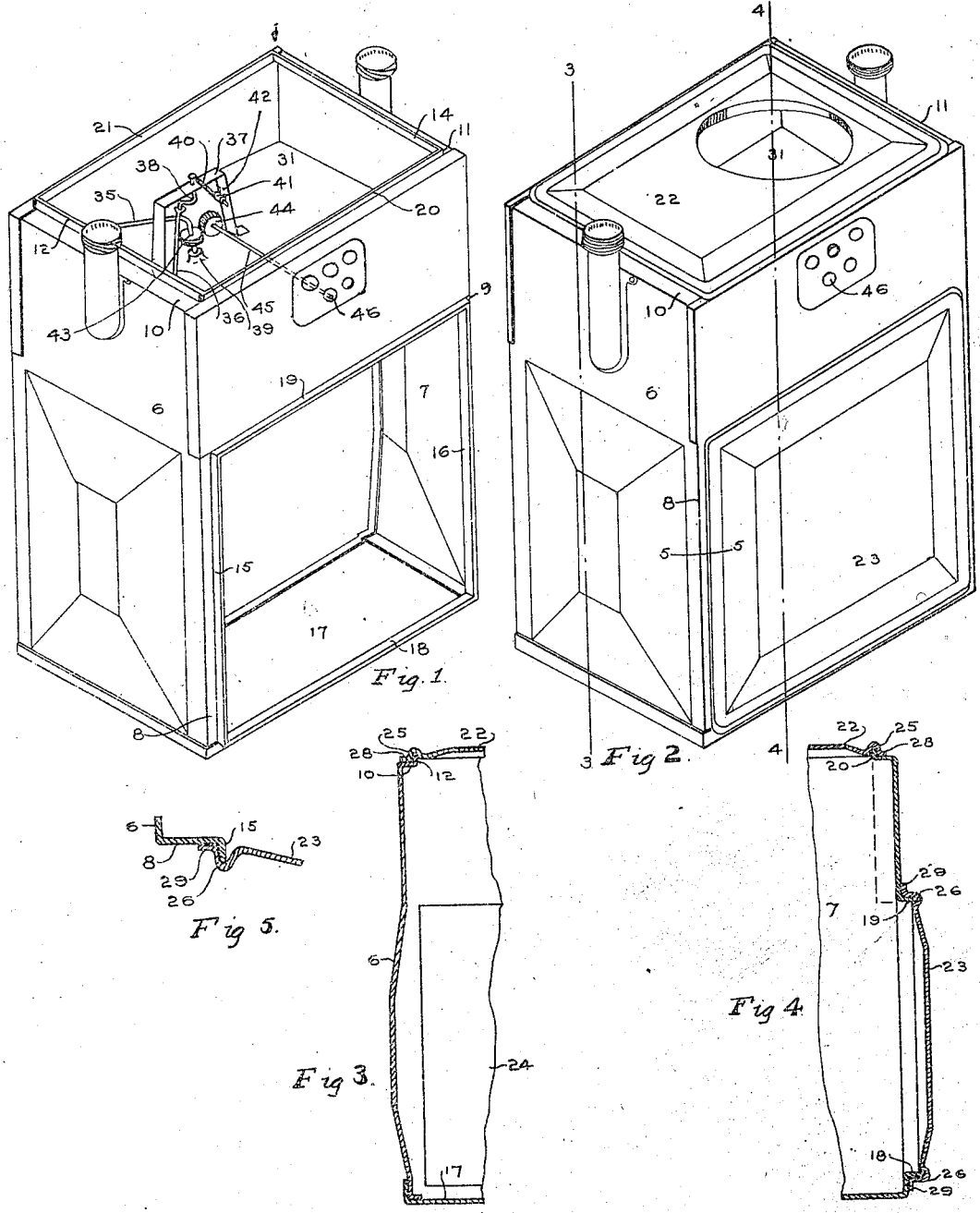

MARSHALL CORNINE, OF MOUNT VERNON, NEW YORK.

METER.

1,191,157.      Specification of Letters Patent.      Patented July 18, 1916.

Continuation of application Serial No. 578,988, filed August 25, 1910. This application filed June 14, 1915. Serial No. 33,666.

*To all whom it may concern:*

Be it known that I, MARSHALL CORNINE, a citizen of the United States of America, residing at Mount Vernon, Westchester county, New York, have invented certain new and useful Improvements in Meters of which the following is a specification.

My invention relates to gas meters and it consists particularly in the arrangement of the motive parts, also in the form of the meter, in the way the meter is put together and in the peculiar features which make for security and convenience in so doing.

Figure 1, is a perspective view of a meter embodying my invention some parts being omitted for clearness of illustration. Fig. 2, is a similar view of said meter with the top and front cases in position. Fig. 3, is a vertical sectional view through a broken portion of the meter on the line 3—3, Fig. 2. Fig. 4, is a similar view on the line 4—4, Fig. 2. Fig. 5, is a detail sectional view on line 5—5, Fig. 2.

Ordinarily meters have the motive parts so arranged that the valve stems are linked to the crank shaft below the worm which communicates motion to the indicator shaft and the structure containing the parts is composed of a tin skeleton including the sides and part of the front, with a tin bottom, soldered on at the base and cases soldered flat to the skeleton. I have varied such arrangement of the stems and the worm, by securing the worm upon the crank shaft below the crank and necessarily also below the level of the valve stems which are linked to the shaft at the crank line. I say "linked" but the manner of connecting these parts is to enlarge the ends of the valve stems sufficiently to permit the formation therein of circular openings of the diameter of the crank of the crank shaft and to pass the end of the shaft through said openings until the rings thus formed on the ends of the stems, surround the crank part of the shaft, which is thus left free to turn in those openings, but when turning, will operate to reciprocate those stems and their respective valves.

By so doing, I bring the stress of the gears closer to the lower bearing of the crank shaft which results in reducing the liability of bending the shaft and therefore makes toward greater reliability in its action, while at the same time it enables me to set the indicator shaft lower and consequently to place the rapidly running indicator (mounted on the outer end of said shaft) on the bottom line of the indicator where it can be more easily seen, since meters are usually set up higher than the head of the observer.

The formation of the inclosing structure as described leaves objectionable seams, particularly at the bottom, where rusting is more likely to occur. It also leaves the case less rigid than it should be to stand the severe handling incident to its repeated testing and transportation. Moreover, when it is tested, it very frequently becomes necessary to remove the top or the front or rear case (the technical name for the front and rear covers 23, 24) in order to gain access to the interior for the purpose of making repairs. If these are in the form of ordinary caps, it is very difficult to remove them. If the edges of the openings and those of the top and of the cases are entirely flat, skilled labor must be employed to replace and secure them or they will be so imperfectly secured, that leaks will occur and even with sufficiently skilled labor, the time taken is a serious charge because it is lengthened by the necessary care required to make a perfect sealing.

In my meter I make a skeleton, the sides 6, 7, of which are pieces of tin, bent to form the side pieces and to extend over on the front and rear along the side edges for an appreciable distance as at 8, 9, from the bottom upwardly, toward (and sometimes to) the top. At the top these side pieces are also bent over and compose an appreciable part of the top, as at 10, 11. The edges of 8, 9, and 10, 11 are bent outwardly and upwardly, at substantially right angles to the main face of the top, the front or the rear (as the case may be) and thus form upright flanges 12, 14, 15, 16 at the top and front, and, at the rear, others similar to 15 and 16. Then I strike up the bottom, in the form of a rectangular pan, 17, from a single piece of metal, adapted to fit over the lower end of the skeleton already described. That part of its upper edge which would lie between the flanges 15 and 16 is bent up to form a complemental flange 18, that is, one which continues the boundary of the case opening from 15 to 16, and a similar flange is likewise formed on the corresponding part of the bottom which lies between the extended sides on the other face of the case. As will be noted, this bottom pan is not integral with either side or the front or the back and it has no joint at any corner, on the level of the outer face of the bottom, consequently no cutting of the plate at the corners is necessary, as in making the ordinary bottom, and there is less opportunity for leakage to occur, particularly oil leakage, which is usually a source of great annoyance. Again the bottom wears out while the sides are yet good. A majority of meter bottoms need renewal, as I know from an experience covering the observation of many thousand meters.

By constructing my meter as shown, I can renew the bottom without discarding the sides or top and without the expenditure of so much time or labor as would otherwise be the case, and would render repairs so expensive as to be unadvisable.

The space from the line of the upper end of flanges 15, 16, to the top and a distance inward from the corner, is filled by other pieces, one in front and one in the rear, called gallery pieces. They are long enough to lap well over the sides and give ample opportunity for soldering.

That part of the lower edge of the gallery piece between flanges 15 and 16 (and the corresponding one at the rear) are turned outward, at substantially right angles to form flanges, one of which, 19, together with flanges 15 and 16 and 18 forms a complete quadrilateral wall about the case opening in the front of the meter, there being of course a similar wall about the case opening in the rear. Then the edges of the gallery pieces which project over the front parts of the top of the meter, are similarly flanged, as at 20 and 21, and those flanges with flanges 12 and 14, wall the opening in the top of the meter. The covers for these several openings, the top 22, the front case 23 and the rear case 24, are shaped to fit over the openings—closely—with such embellishment of design as may be desired, but these edges, besides the ordinary downwardly or inwardly extending flanges, 25 at the top, 26 on the front case, (and the corresponding one not shown, but on the rear case), have also, at the extremity of that flange or wall, a horizontally extended flange 28 on the top, a similar flange 29 on flange 26, (and a corresponding one on the corresponding flange at the rear, not shown) at right angles, or substantially so to the connected walls 25, 26 and its mate, and parallel with the proximate faces of the front, the rear or the top of the case.

The ordinary joints are soldered as usual, but in soldering the joints between flanges 25 and 28, 26 and 29, and the corresponding rear flanges and the parts to which they fit, the mechanic draws his soldering iron along the angle in the two flanges of the covers and the solder will extend inwardly and fill the space between the flat face of the case and the extreme flanges of said covering parts, and also up between the flanges 25, 26 and so forth, and the upright flange walls, surrounding said respective openings in the meter.

The result is first, the upright flanges about the openings stiffen the meter very much and thus render it more durable, second, the solder filling the angular space, makes a much stronger fastening than it would if both faces were absolutely flat and yet the solder may be applied even more easily than if they were flat for there are walls to hold it to its proper placement; third, when top 22, the case 23, or the case 24, is to be removed (the parts lying flat at the edges), a knife can be readily run along under the flange 28, 29 or the one on the case 24, corresponding to the one marked 29 on the case 23, and the solder loosened so that the covering part may be readily thrown off, which could not be done if the face of the meter rose above the level of the flanges 28, 29 or the one on the case 24, corresponding to the one marked 29 on the case 23. No joint as strong as this one can be as readily broken with such a tool as can this, a matter of moment when thousands are to be removed. Fourth, these covering portions may be as readily and quickly replaced, the flanges fit exactly over the meter-flange and go into place at once, without the necessity of scraping or that high degree of skill in the artisan, which other forms require.

Within the structure, formed as described, and at a level just above the upper edge of the bellows, I locate a partition 31 called the table top, dividing the bellows holding part of the meter from the valve chest, as I denominate the space between the table top and the upper end of the meter. On this table top 31, are two valves (not shown) from which valve stems 35 and 36 extend toward the central part of the inclosed space. Within that space and preferably somewhere near its horizontal center I erect a bridge 37, and below it a step 39. In said bridge and step, I mount the crank shaft provided with a crank 38, a worm 43 below the crank, and a crank arm 40, above the bridge, in which the shaft is journaled. The crank is connected to the valve stem as already noted. The crank arm is threaded and provided with a threaded sleeve 41, carrying a pivot 42 to receive the ends of the flag arms, but as the flag arms and further parts are of well known form and operation I have not thought it necessary to show them. Near the worm, in suitable bearings I mount the indicator shaft 45, connected, preferably, directly to the rapidly moving indicator 46 and carrying a gear 44 which meshes with the worm 43 on the crank shaft and thus transmits the required motion.

The operation of the parts just described is so obvious that further description is not needed.

What I claim is:—

A gas meter having a one piece bottom, which overlaps and extends upwardly along the four upright sides of the meter for a short distance and is soldered thereto near the bottom line, and is provided, along a portion of its upper edge, with a flange substantially parallel to the flat bottom portion, all substantially as set forth.

In testimony whereof, I have signed my name to this specification in the presence of two subscribing witnesses, this 9th day of June, 1915.

MARSHALL CORNINE.

Witnesses:
 DAVID R. JONES,
 CHRISTOPHER HUSSNER.